(12) United States Patent
Linares (10) Patent No.: US 8,146,516 B2
(45) Date of Patent: *Apr. 3, 2012

(54) STRUCTURAL SUPPORTING SUBSTRATE INCORPORATED INTO A COMPOSITE AND LOAD SUPPORTING PLATFORM

(75) Inventor: Miguel A. Linares, Bloomfield Hills, MI (US)

(73) Assignee: Oria Collapsibles, LLC, Auburn Hills, MI (US), part interest ( * ) Notice: Subject to any disclaimer, the term of this patent is extended or adjusted under 35 U.S.C. 154(b) by 210 days.

This patent is subject to a terminal disclaimer.

(21) Appl. No.: 12/608,512

(22) Filed: Oct. 29, 2009

(65) Prior Publication Data

US 2010/0043678 A1   Feb. 25, 2010

Related U.S. Application Data

(63) Continuation-in-part of application No. 12/467,601, filed on May 18, 2009, which is a continuation-in-part of application No. 12/414,017, filed on Mar. 30, 2009.

(51) Int. Cl.
*B65D 19/38* (2006.01)
(52) U.S. Cl. ................................ 108/57.25; 108/51.3
(58) Field of Classification Search ............ 108/57.25, 108/51.3, 57.26, 57.27, 57.28, 57.34, 51.11, 108/55.1, 55.5; 248/346.02; 206/386, 600, 206/595, 598
See application file for complete search history.

(56) References Cited

U.S. PATENT DOCUMENTS

| | | | |
|---|---|---|---|
| 2,477,852 A * | 8/1949 | Bacon | 428/116 |
| 2,709,559 A | 5/1955 | Geisler | |
| 2,913,206 A | 11/1959 | Paris | |
| 2,914,282 A * | 11/1959 | Budd | 108/51.3 |
| 3,556,886 A | 1/1971 | Reusser | |
| 3,568,912 A | 3/1971 | de Simas | |
| 3,580,190 A | 5/1971 | Fowler | |
| 3,587,479 A * | 6/1971 | Geschwender | 108/51.3 |
| 3,664,272 A | 5/1972 | Sanders | |
| 3,675,595 A | 7/1972 | Sullivan | |
| 3,710,733 A | 1/1973 | Story | |
| 3,719,157 A | 3/1973 | Arcocha et al. | |
| 3,720,176 A | 3/1973 | Munroe | |
| 3,814,778 A | 6/1974 | Hosoda et al. | |
| 3,832,955 A | 9/1974 | Pottinger et al. | |
| 3,955,613 A | 5/1976 | Lund | |
| 3,982,057 A * | 9/1976 | Briggs et al. | 108/51.3 |
| 4,220,100 A | 9/1980 | Palomo et al. | |
| 4,507,348 A * | 3/1985 | Nagata et al. | 108/57.25 |

(Continued)

FOREIGN PATENT DOCUMENTS

JP            02139341 A      5/1990

(Continued)

*Primary Examiner* — Jose V Chen
(74) *Attorney, Agent, or Firm* — Gifford, Krass, Sprinkle, Anderson & Citkowski, P.C.

(57) ABSTRACT

A skeletal substrate associated with a composite over spray or over molded article, such as a stackable pallet. The skeletal substrate includes a three dimensional article, such as a durable corrugated paperboard or other material, with a load supporting and planar upper surface and a recess configured and pallet fork receiving underside. The substrate incorporates a repeating pattern of cylindrical, polygonal, wave like or other shapes, such as which are coated in built up fashion with a polymeric material in order to provide insulating of the substrate from the environment as well as to provide additional strength.

16 Claims, 8 Drawing Sheets

U.S. PATENT DOCUMENTS

| | | | | |
|---|---|---|---|---|
| 4,597,338 | A | 7/1986 | Kreeger | |
| 4,715,294 | A | 12/1987 | Depew | |
| 4,829,909 | A | 5/1989 | Mandel | |
| 4,843,976 | A | 7/1989 | Pigott et al. | |
| 4,931,340 | A | 6/1990 | Baba et al. | |
| 5,076,176 | A * | 12/1991 | Clasen | 108/51.3 |
| 5,082,712 | A | 1/1992 | Starp | |
| 5,143,778 | A | 9/1992 | Shuert | |
| 5,205,221 | A * | 4/1993 | Melin et al. | 108/51.3 |
| 5,320,048 | A | 6/1994 | Feiner | |
| 5,365,858 | A | 11/1994 | Kuhns | |
| 5,401,456 | A | 3/1995 | Alesi, Jr. et al. | |
| 5,423,428 | A | 6/1995 | Selz | |
| 5,473,995 | A | 12/1995 | Gottlieb | |
| 5,476,048 | A | 12/1995 | Yamashita et al. | |
| 5,551,353 | A * | 9/1996 | Fiedler | 108/51.3 |
| 5,579,686 | A | 12/1996 | Pigott et al. | |
| 5,605,102 | A * | 2/1997 | Simpson | 108/51.3 |
| 5,687,652 | A | 11/1997 | Ruma | |
| 5,709,913 | A | 1/1998 | Andersen et al. | |
| 5,868,080 | A | 2/1999 | Wyler et al. | |
| 5,890,437 | A | 4/1999 | Hill | |
| 6,209,464 | B1 | 4/2001 | Elder | |
| 6,294,114 | B1 | 9/2001 | Muirhead | |
| 6,357,364 | B1 | 3/2002 | Maloney et al. | |
| 6,357,366 | B1 | 3/2002 | Frankenberg | |
| 6,524,426 | B1 | 2/2003 | St. John et al. | |
| 6,530,330 | B2 * | 3/2003 | Sepe et al. | 108/44 |
| 6,569,509 | B1 | 5/2003 | Alts | |
| 6,598,541 | B2 | 7/2003 | Vilkki | |
| 6,655,299 | B2 * | 12/2003 | Preisler et al. | 108/51.3 |
| 6,705,237 | B2 | 3/2004 | Moore, Jr. et al. | |
| 6,745,703 | B2 * | 6/2004 | Torrey et al. | 108/51.11 |
| 6,863,003 | B2 | 3/2005 | Grainger | |
| 6,938,559 | B2 | 9/2005 | Wullenweber | |
| 6,954,982 | B2 | 10/2005 | Isle et al. | |
| 6,972,144 | B2 | 12/2005 | Roth et al. | |
| 6,976,437 | B2 | 12/2005 | Fisch et al. | |
| 7,013,814 | B2 * | 3/2006 | Modesitt et al. | 108/51.3 |
| 7,143,564 | B2 * | 12/2006 | Renck | 52/783.17 |
| 7,197,989 | B2 | 4/2007 | Apps | |
| 7,469,643 | B2 | 12/2008 | Isle et al. | |
| 7,726,248 | B2 | 6/2010 | Shuert | |
| 7,804,400 | B2 | 9/2010 | Muirhead | |
| 7,819,068 | B2 | 10/2010 | Apps et al. | |
| 2002/0007770 | A1 | 1/2002 | Vilkki | |
| 2002/0106483 | A1 | 8/2002 | Obeshaw | |
| 2002/0148393 | A1 | 10/2002 | Milles | |
| 2003/0024443 | A1 | 2/2003 | Hoshi | |
| 2003/0041956 | A1 | 3/2003 | Pigott et al. | |
| 2003/0070594 | A1 | 4/2003 | Isle et al. | |
| 2003/0136315 | A1 | 7/2003 | Kim | |
| 2003/0189152 | A1 | 10/2003 | Elder et al. | |
| 2004/0007164 | A1 | 1/2004 | Herring et al. | |
| 2004/0187745 | A1 | 9/2004 | Rojas et al. | |
| 2005/0076816 | A1 | 4/2005 | Nakano | |
| 2005/0211139 | A1 | 9/2005 | Perrotta et al. | |
| 2005/0241548 | A1 | 11/2005 | Muirhead | |
| 2006/0003044 | A1 | 1/2006 | DiNello et al. | |
| 2006/0075939 | A1 | 4/2006 | Shuert | |
| 2006/0130712 | A1 * | 6/2006 | Wang | 108/57.25 |
| 2006/0144301 | A1 | 7/2006 | Borggaard | |
| 2006/0201402 | A1 * | 9/2006 | Moore et al. | 108/57.25 |
| 2006/0235780 | A1 | 10/2006 | Carney | |
| 2006/0288915 | A1 | 12/2006 | Kulbeth et al. | |
| 2007/0215014 | A1 | 9/2007 | Lee | |
| 2007/0283857 | A1 | 12/2007 | Dong | |
| 2008/0053596 | A1 | 3/2008 | Davies et al. | |
| 2008/0060561 | A1 | 3/2008 | Carrasco | |
| 2008/0098935 | A1 | 5/2008 | Roth et al. | |
| 2008/0103944 | A1 | 5/2008 | Hagemann et al. | |
| 2008/0110377 | A1 | 5/2008 | Stevens | |
| 2008/0156234 | A1 | 7/2008 | van de Camp | |
| 2008/0196633 | A1 * | 8/2008 | Ho | 108/51.3 |
| 2008/0210140 | A1 | 9/2008 | Valentinsson | |
| 2010/0154685 | A1 | 6/2010 | Arinstein | |

FOREIGN PATENT DOCUMENTS

| | | |
|---|---|---|
| JP | 03029744 A | 2/1991 |
| JP | 06156493 A | 6/1994 |
| JP | 06-235780 A | 8/1994 |
| JP | 08034014 A | 2/1996 |
| JP | 08034438 A | 2/1996 |
| JP | 08336866 A | 12/1996 |
| JP | 11079180 A | 3/1999 |
| JP | 11221828 | 8/1999 |
| JP | 2001-328632 A | 11/2001 |
| JP | 2002166940 A | 6/2002 |
| JP | 2003011969 A | 1/2003 |
| JP | 2003-034330 A | 2/2003 |
| JP | 2003-267370 A | 9/2003 |
| JP | 2004090988 A | 3/2004 |
| JP | 2005104562 A | 4/2005 |
| JP | 2006036315 A | 2/2006 |
| JP | 2006036331 A | 2/2006 |
| JP | 2006298403 A | 11/2006 |
| JP | 2008023741 A | 2/2008 |
| JP | 2008087839 A | 4/2008 |
| KR | 20030034370 A | 5/2003 |
| KR | 10-0577441 | 5/2006 |
| KR | 1020090117107 | 11/2009 |
| WO | WO-2006082595 A1 | 8/2006 |

* cited by examiner

STRUCTURAL SUPPORTING SUBSTRATE INCORPORATED INTO A COMPOSITE AND LOAD SUPPORTING PLATFORM

CROSS-REFERENCE TO RELATED APPLICATIONS

This application is a continuation-in-part of U.S. patent application Ser. No. 12/467,601, filed May 18, 2009 (pending), which claims the benefit of U.S. provisional patent application Ser. No. 61/074,306, filed Jun. 20, 2008 (now abandoned), and which is a continuation-in-part of U.S. patent application Ser. No. 12/414,017, filed on Mar. 30, 2009 (pending), which claims the benefit of U.S. provisional patent application Ser. No. 61/040,228 filed Mar. 28, 2008 (now abandoned).

FIELD OF THE INVENTION

The present invention generally relates to a composite stackable construction for providing heavy duty platform support. More particularly, the present invention teaches a skeletal substrate associated with a composite over spray or over molded article, such as a stackable pallet. The skeletal substrate includes a three dimensional article, such as a durable corrugated paperboard or other material, with a load supporting and planar upper surface and a recess configured and pallet fork receiving underside. The substrate incorporates a repeating pattern of cylindrical, polygonal, wave like or other shapes, such as which are coated in built up fashion with a polymeric material in order to provide insulating of the substrate from the environment as well as to provide additional strength.

BACKGROUND OF THE INVENTION

Transport and support pallet assemblies are known in the relevant art and which are provided for supporting varying sized loads during storage or transport. Such pallet assemblies can include such as wooden or plastic construction and can further exhibit multi-piece construction.

SUMMARY OF THE INVENTION

The present invention discloses a structurally reinforcing and three dimensional article, such as a pallet, having a structurally supporting skeletal substrate. The skeletal substrate includes a three dimensional article, such as a durable corrugated paperboard or other material including a galvanized steel exhibiting a rigid and structurally supporting construction and with a load supporting and planar upper surface and a recess configured and pallet fork receiving underside.

The substrate incorporates a repeating pattern of cylindrical, polygonal, wave like or other shapes, such as which are coated in built up fashion with a polymeric material in order to provide insulating of the substrate from the environment as well as to provide additional strength. A composite plasticized material is over-molded or otherwise applied upon the structural insert according to a selected thickness to encapsulate the insert. The composite material can further include any of a heat/fire thermosetting or a thermoplastic material. Additional variants contemplate an aggregate material entrained or otherwise mixed within the plasticized material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to the following illustrations, a series of perspective and sectional/cutaway views are shown of a variety of structural supporting inserts such as which are incorporated into selected composite stackable pallet construction. As previously described, the stackable pallet construction is designed so as to provide heavy duty support of items located thereupon and exhibits, according to the selected variant, a structural spine or insert (such as a heavy duty paperboard corrugated material or galvanized insert) which operates to greatly enhance the strength of the pallet assembly in supporting heavier loads set thereupon.

As will be further described in detail, the mariner of constructing the structural pallet article is such that the inner structural supporting insert is placed within a mold cavity, or other manufacturing medium associated with the creation of the pallet article, and about which is injection molded or otherwise formed a fire/heat proof composite thermoset or composite thermoplastic material. As will be further described, the completed pallet article can be solid, however can also encompass interiorly extending open apertured locations, recesses or other configurations, these further reducing the overall weight of the pallet without compromising its strength. The underside of each pallet can further exhibit linear width and/or length extending recesses, and which are designed to seat inserting forks associated with a conventional forklift machine.

Figure 1:
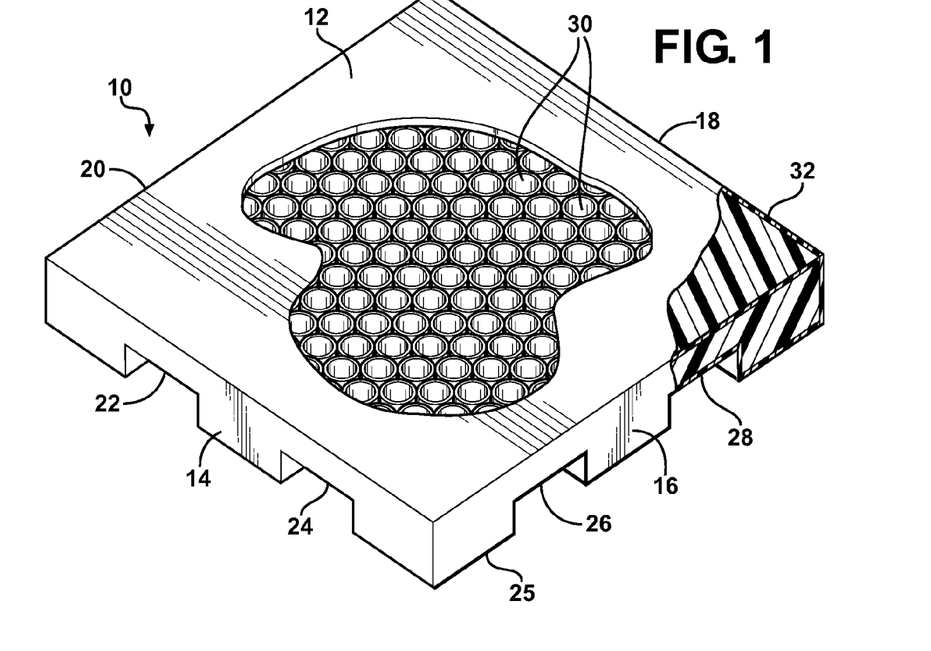
FIG. 1 is a perspective view hi partial cutaway of a structural supporting skeletal substrate incorporated into a polymeric built up and load support pallet and exhibiting a plurality of vertically extending tubular portions according to a first pattern.

Referring now to FIG. 1, a perspective view is generally shown at 10 in partial cutaway of a structural supporting skeletal substrate according to one non-limiting embodiment. The substrate as shown exhibits a generally planar and three dimensional shape with a top exhibiting a planar surface 12, a plurality of four interconnected sides 14, 16, 18 and 20 and a generally hidden underside defining a generally square or rectangular shape. Also shown are a plurality of recessed and underside accessible surfaces, see at 22 and 24 associated with side 14 and further at 26 and 28 with interconnected side 16, and which are incorporated into the substrate construction in order to receive forward inserting forks (not shown) associated with a pallet lift vehicle or the like.

As previously indicated, the layers 12-20 defining the skeletal support or substrate insert are constructed of any of a number of materials, but according to non-limiting and preferred embodiments can include such as a pretreated and heavy duty corrugated paperboard or a galvanized and lightweight metal. As further shown in FIG. 1, a plurality of vertically extending tubular or cylindrical sleeve shaped portions are illustrated in removed cutaway, at 30, and which are sized and arranged in side-by-side aligned fashion so as to vertically extend fashion a specified height corresponding generally to an overall height of the substrate 10.

The portions 30 are, in one variant, constructed of a similar corrugated paperboard or galvanized material, however are also envisioned to include other materials. As further shown in FIG. 3, an enlarged sectional cutout view of the tubular portions 30 is again illustrated and exhibiting a first specified individual wall thickness corresponding to the desired structural performance requirements of the substrate.

Figure 3:
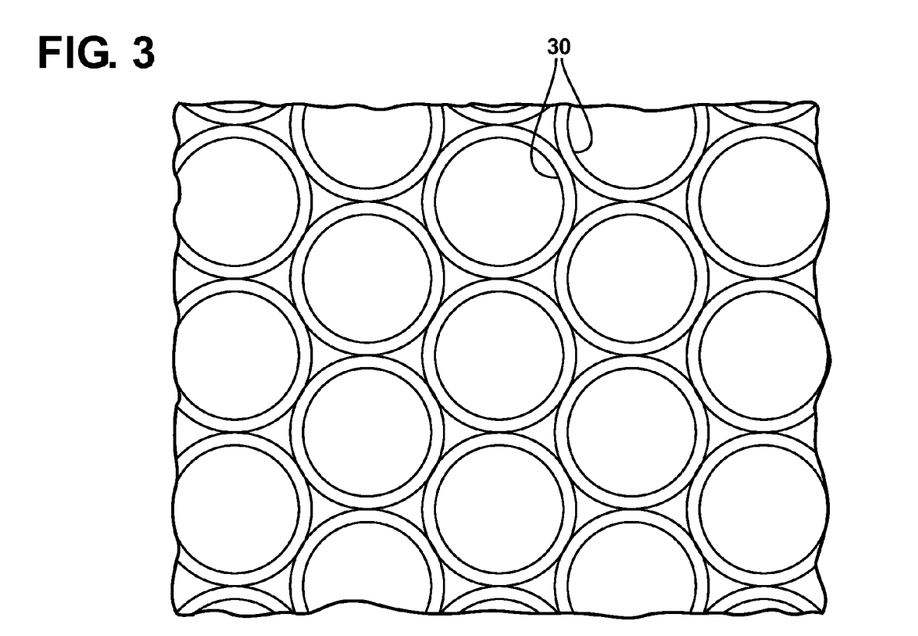
FIG. 3 is an enlarged sectional cutout view of the tubular portions as exemplary shown in the variant of FIG. 1 and exhibiting a first specified individual wall thickness.

In use, the sleeve portions 30 provide structural support to the substrate and can, in one application, be both environmentally pre-treated (such as by application of water and mildew resistant sprays or coatings) prior to being encased within the outer assembled top 12, sides 14-20 and bottom of the structure and in order to provide increased levels of structural and load bearing support. Alternatively, the cylindrical portions 30 can remain accessible through any arrangement of apertures or openings defined in the top, sides or bottom of the substrate.

As further shown, a subsequently applied polymeric material (see as further representatively illustrated by polymeric built-up portion 32 which can be provided to any thickness and which can include either or both of a spray on plastic or a dipped/molten flowing material) can coat or build up either the exterior surfaces of the substrate. Although not shown, it is also understood that the polymeric applied material can incorporate or entrain an aggregate or other suitable additive in order to enhance its performance characteristics.

Alternatively, and depending upon any particular apertured configuration imparted into the surfaces of the substrate in combination with the particular manufacturing process employed, the polymeric flowable or sprayed material can also flow into the interior of the substrate where the portions 30 are located in order to coat and seat about them according to a desired thickness. In each of the disclosed variants, and in particular where the substrate material is a corrugated paperboard, it is desirable to maintain the integrity of the material from the effects or environmental moisture and contaminants, this tending to degrade both its physical properties and load supporting characteristics.

Figure 2:
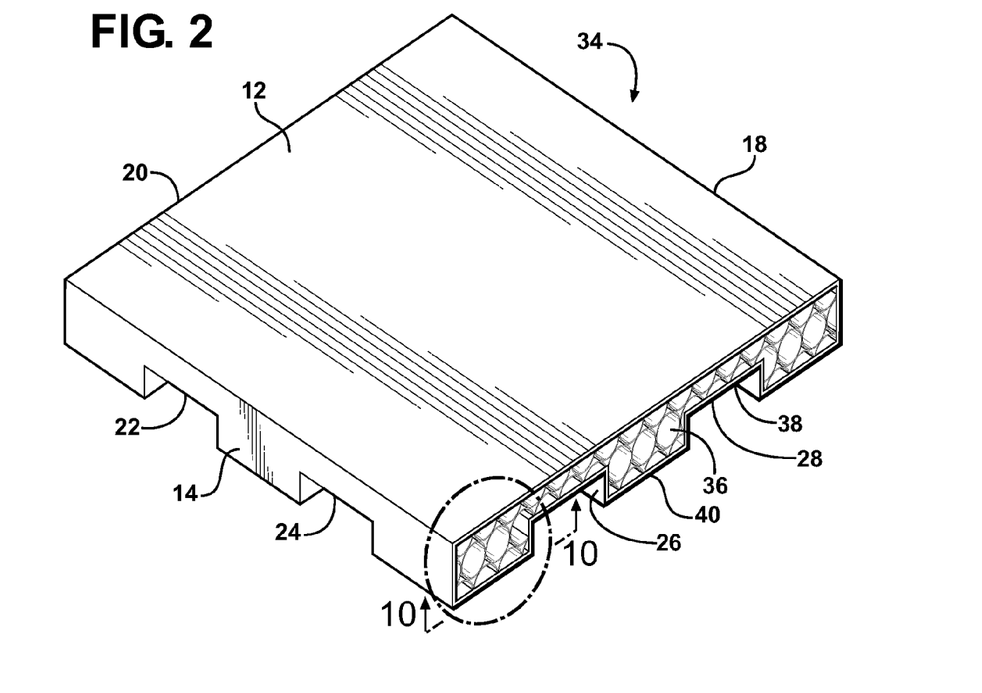
FIG. 2 is a succeeding perspective view of a further slightly modified substrate exhibiting a plurality of horizontally extending tubular portions.

Referring now to FIG. 2, a succeeding perspective view is shown at 34 of a further slightly modified substrate from that shown in FIG. 1 and which exhibits a pluralities of horizontally (lengthwise) extending tubular portions defied within the three dimensional structural substrate, these including a first extending central row 36 and each of parallel upper 38 and lower 40 half-pipe rows. A partial illustration is further shown in FIG. 10 of an enlarged side illustration of area 10-10 in FIG. 2 and illustrating the horizontal extending arrangement of the tubular portions 36, 38 and 40, such as extending between top 12, side 14 and a bottom-most location 25 intended to designate a location of maximum thickness of the pallet construction.

As previously indicated, the overall shape of the substrate, as defined by the top 12, sides 14-20 and bottom surfaces, is consistently illustrated throughout the several views depicted herein, such that the same reference numerals are repeated throughout (with reference also to FIGS. 11-18) for purposes of ease of explanation. That said, the present invention also contemplates the use of any outer defined shape associated with the structural supporting substrate, this including panel shaped or otherwise.

Figure 10:
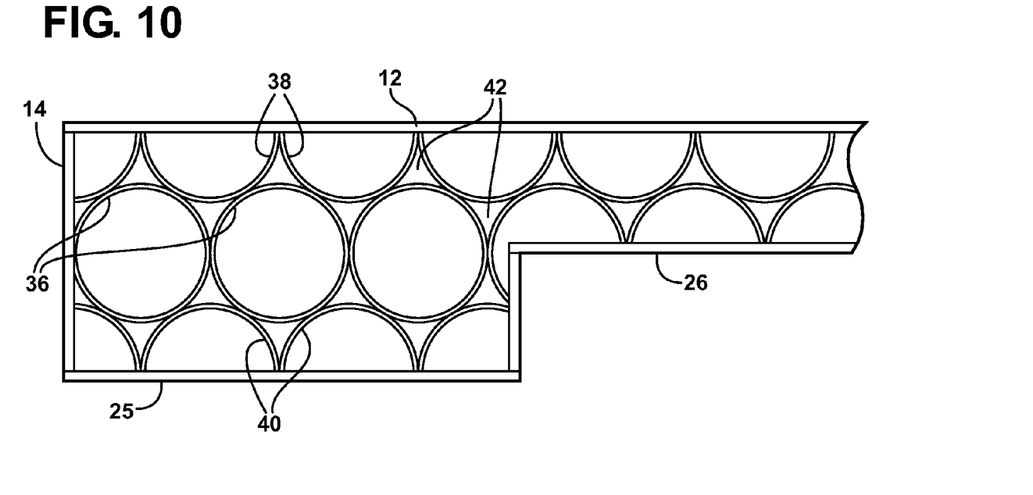
FIG. 10 is an enlarged side illustration of area 10-10 in FIG. 2 and illustrating the horizontal extending arrangement of the tubular portions.

As further shown, the side 16 illustrated in FIG. 1 is removed in FIGS. 2 and 10, such as to illustrate the manner in which the designated rows of cylindrical portions 36, 38 and 40 horizontally extend. Alternatively, it is envisioned that one or more sides of the substrate (such as again referenced at 14, 16, 18 and 20) can be removed in order to facilitate a polymeric built-up coating within the inner defined surfaces of each portion 36, 38, 40 as well as separated areas between each portion (see further at 42).

Figure 4:
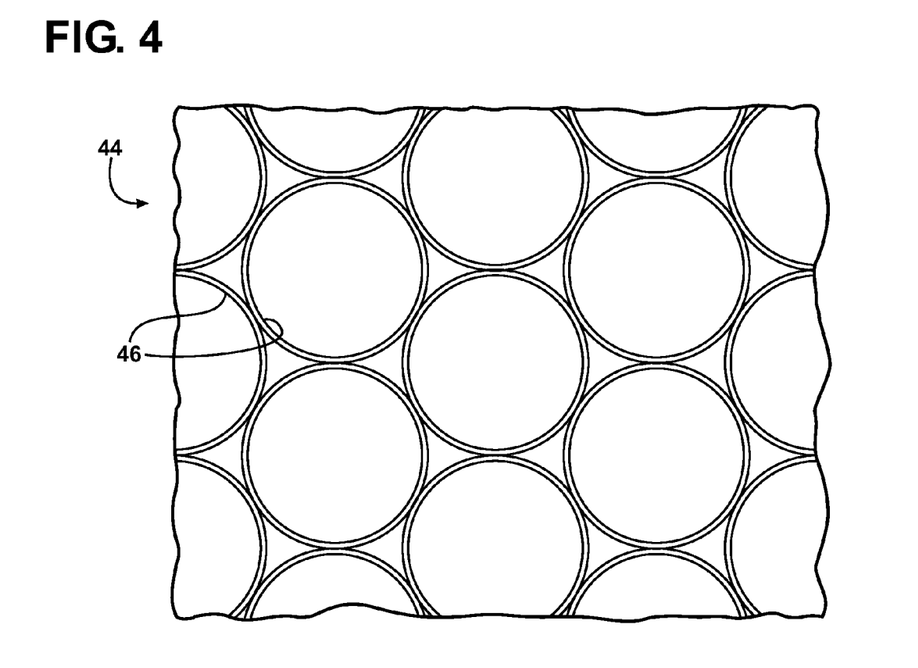
FIG. 4 is a sectional view of a plurality of tubular portions exhibiting a second and lesser specified wall thickness.
Figure 5:
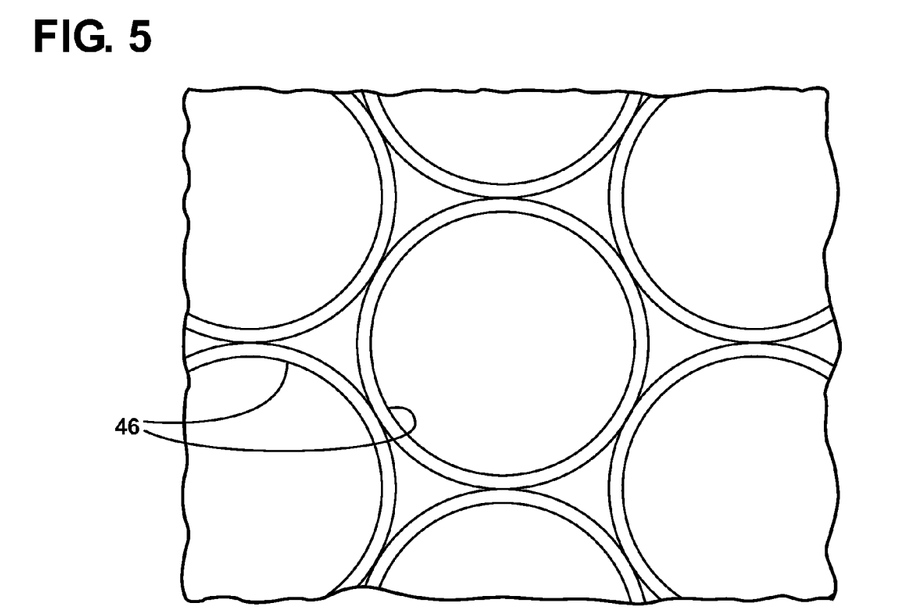
FIG. 5 is an enlarged sectional of the tubular portions shown in FIG. 4.
Figure 6:
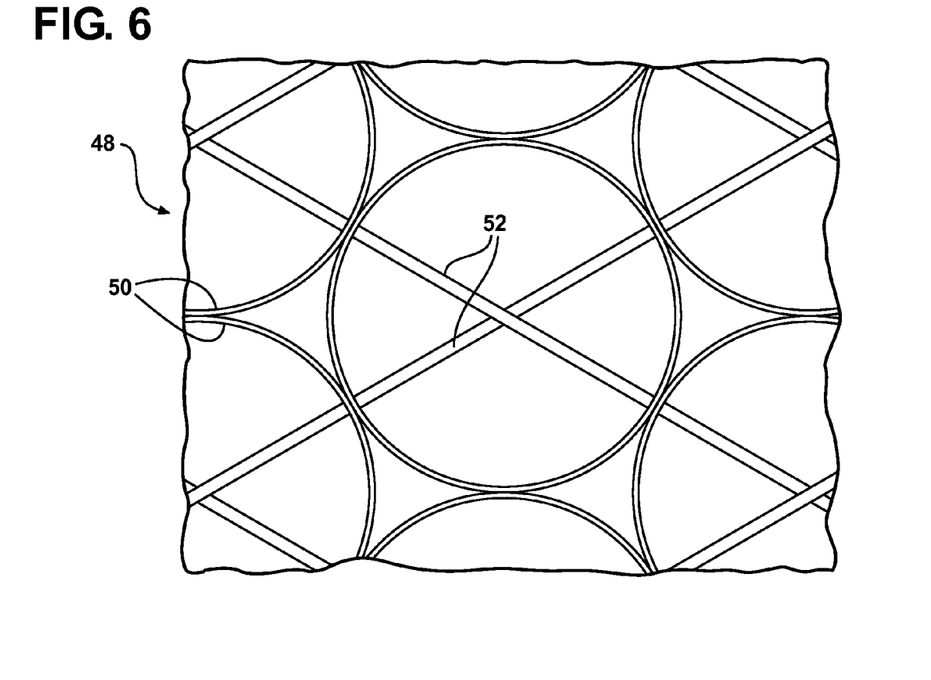
FIG. 6 is a modified sectional view of a further plurality of thin walled tubular portions combined with an interconnecting and crosswise extending wall grid pattern for achieving additional structural support.

In comparison to FIG. 3, FIG. 4 is a further sectional view 44 of a plurality of tubular portions 46, each exhibiting a second and lesser specified wall thickness than which is associated with the portions 30 referenced in the variant of FIGS. 1 and 3. FIG. 5 is an enlarged sectional of the tubular portions shown in FIG. 4, with FIG. 6 further exhibiting a modified sectional view, at 48, of a further plurality of even thinner walled tubular portions 50 combined with an interconnecting and crosswise extending wall grid pattern, see at 52, which intersects the vertically extending portions for achieving additional structural support. The grids 52, although shown in top cutaway, can extend either partially or entirely the distance between the top 12 and bottom 25 surfaces of the substrate corresponding to the maximum height of the substrate.

Figure 7:
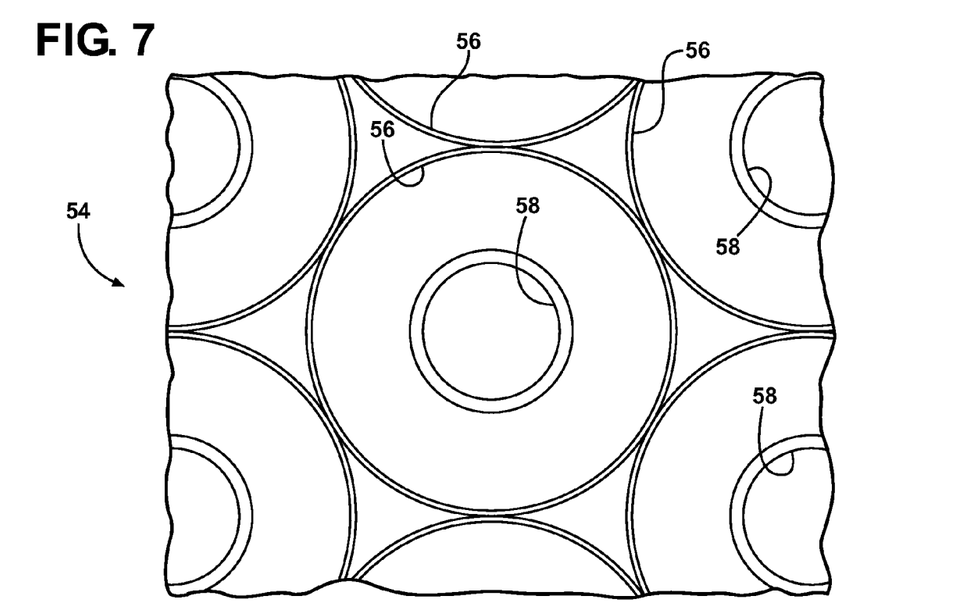
FIG. 7 is a further sectional illustration of a plurality of tubular portions exhibiting individual concentric patterns.

Referring now to FIG. 7, a further sectional illustration is shown at 54 of a plurality of tubular portions 56, each of which individually exhibits an additional and inner concentric pattern, see inner portions 58. Although not shown, each individual outer tubular portion 56 and inner coaxial portion 58 can be individually sealed. Alternatively, and consistent with the previous description, outer layers of the substrate can be open at locations to coat the exterior of the portions, these further potentially including additional apertured or slotted locations to facilitate inner flow of polymeric material to assist in coating the inner portions 58.

Figure 8:
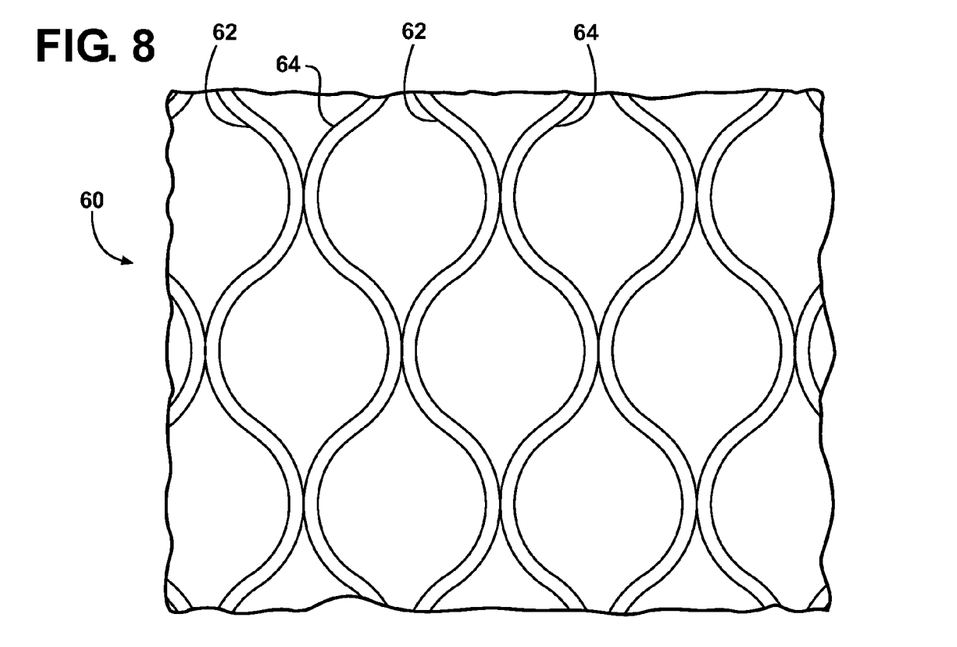
FIG. 8 is an illustration of a plurality of undulating or wave-like interconnected portions according to a further substrate pattern.
Figure 9:
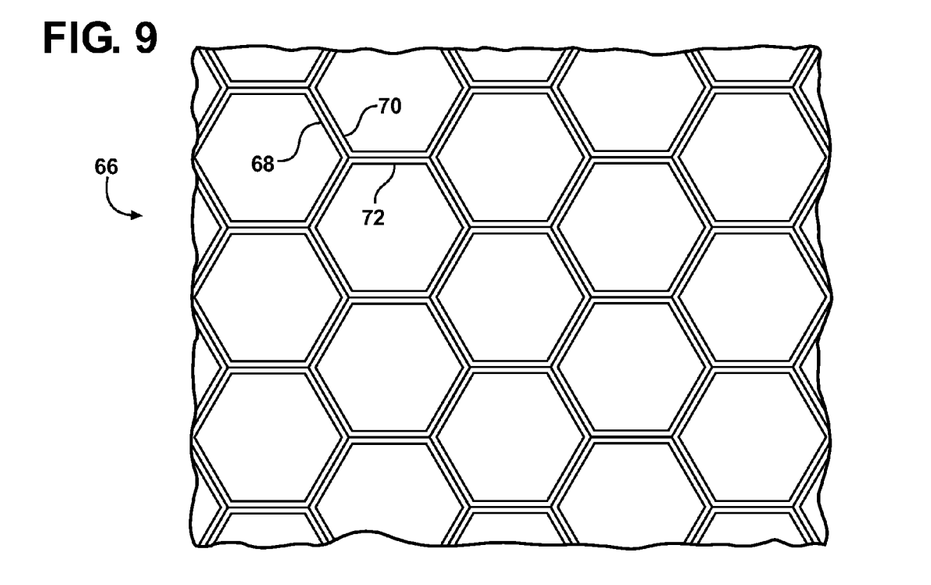
FIG. 9 is an illustration of a pseudo honeycomb pattern exhibited by a plurality of hexagonal cross sectional shaped portions.

Referring to FIG. 8, an illustration is shown at 60 of a plurality of undulating or wave-like interconnected portions, see at 62, 64, in sequential and repeating fashion, this according to a further substrate pattern. FIG. 9 is an illustration at 66 of a further plurality of interior structural supporting portions pseudo honeycomb pattern, see individual and adjoining edge portions 68, 70, 72, et seq., each of which exhibits a hexagonal cross sectional shaped portions.

Figure 11:
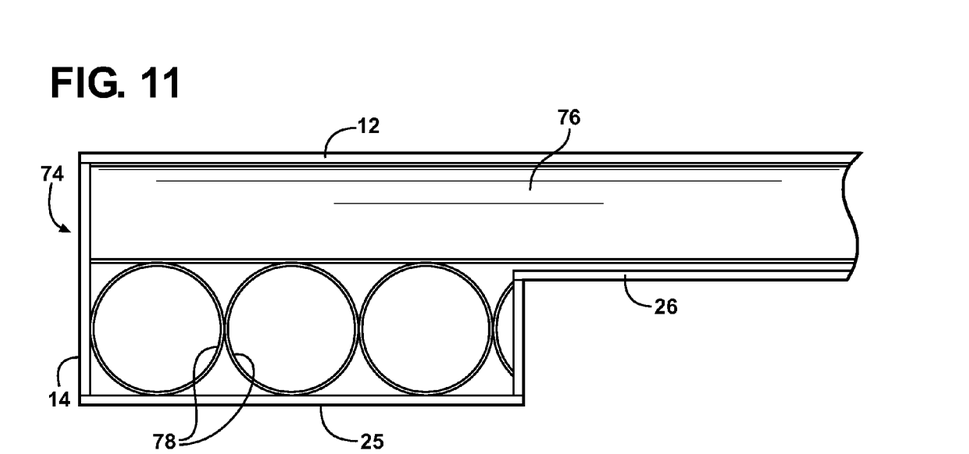
FIG. 11 is a view similar to FIG. 10 of a first selected modified structure and illustrating a first upper row of tubular portions and a second lower and crosswise extending row of tubular portions encased within an outer frame of the skeletal substrate.
Figure 12:
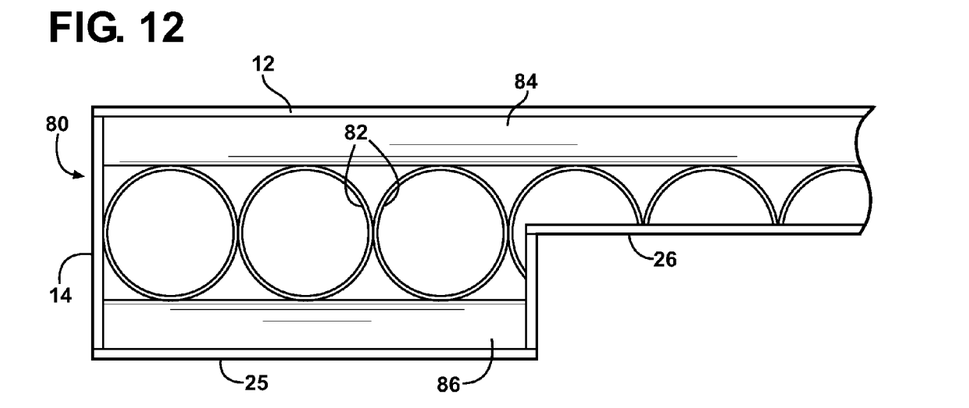
FIG. 12 is a further modification to that show in FIG. 11 and by which a central row of tubular portions is separated by upper and lower half tubular portions.

Proceeding to FIG. 11, a view similar to FIG. 10 is shown at 74 of a first selected modified structure and illustrating a first upper row of tubular portions (shown by representative portion 76) and a second lower and crosswise extending row of tubular portions, see further as defined by tubular walls 78, again encased within the outer frame of the skeletal substrate. FIG. 12 is a further modification to that show in FIG. 11, at 80, and by which a central row of tubular portions, at 82, is separated by upper 84 and lower 86 (reduced length) half tubular portions.

Figure 13:
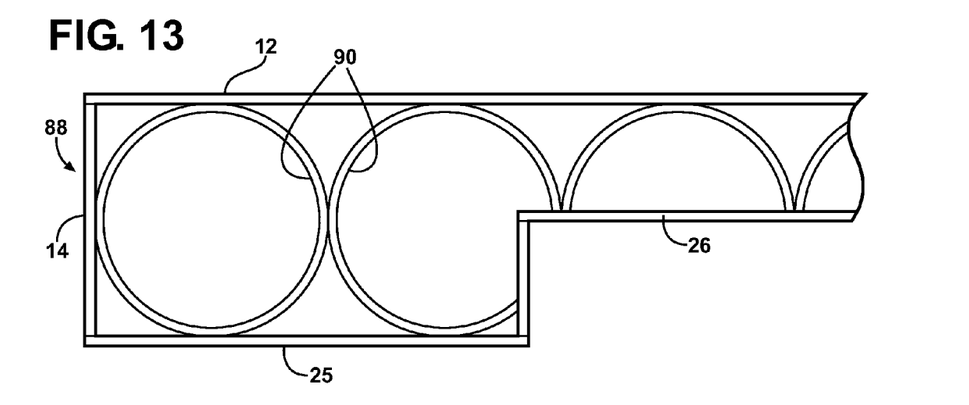
FIG. 13 is a further variation in which a single horizontally extending row of tubular portions of enlarged diameter are incorporated within the outer substrate frame.
Figure 14:
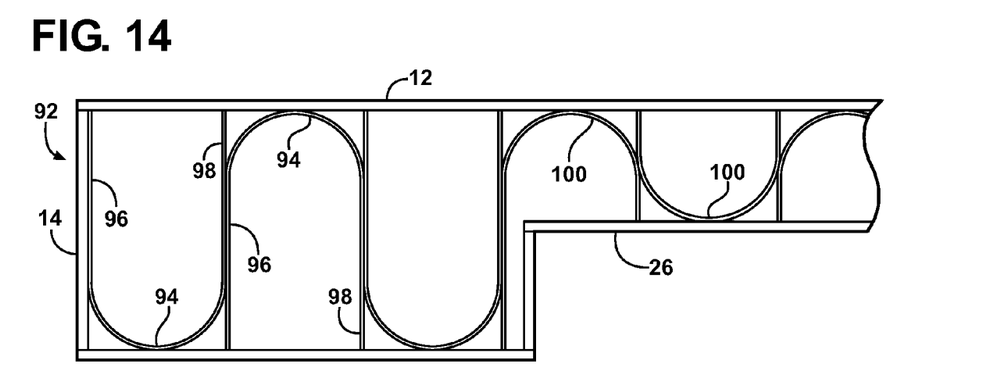
FIG. 14 is a further variation of a single row of modified elongated and open ended tubular portions each adopting a generally "U" shape.

FIG. 13 is a yet further variation 88 in which a single horizontally extending row of tubular portions 90 of enlarged diameter are incorporated within the outer substrate frame (again representatively shown by top 12, side 14 and bottom most surface 25 and inwardly stepped recessed surface 26. FIG. 14 is a further variation, at 92, of a single row of modified elongated and open ended tubular portions each adopting a generally "U" shape with a curved base 94 and interconnected sides 96 and 98 which are arranged relative to the top 12 and bottom 25 surfaces in aligning and alternating direction. As further shown, the dimension of the open ended tubular portions decreases, see as further shown at 100 at a location corresponding to the arrangement of the recessed underside 26.

Figure 15:
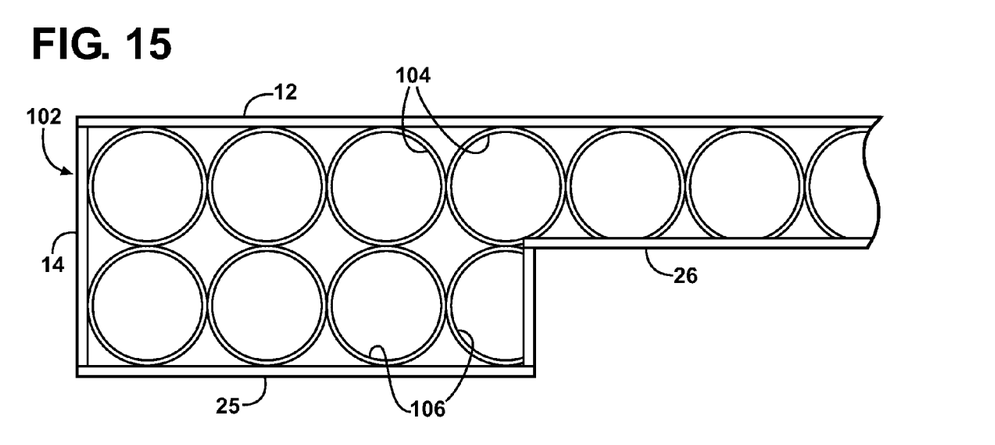
FIG. 15 is an illustration similar to FIG. 11 and depicting upper and lower parallel extending rows of tubular portions.
Figure 16:
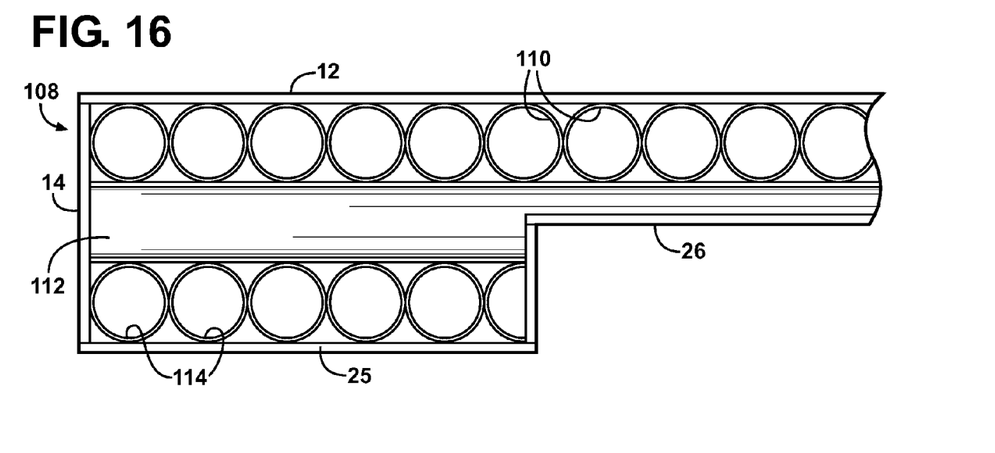
FIG. 16 is an illustration similar to FIG. 12 and depicting first, second and third horizontally extending and vertically spaced rows of tubular portions in alternating crosswise extending fashion.
Figure 17:
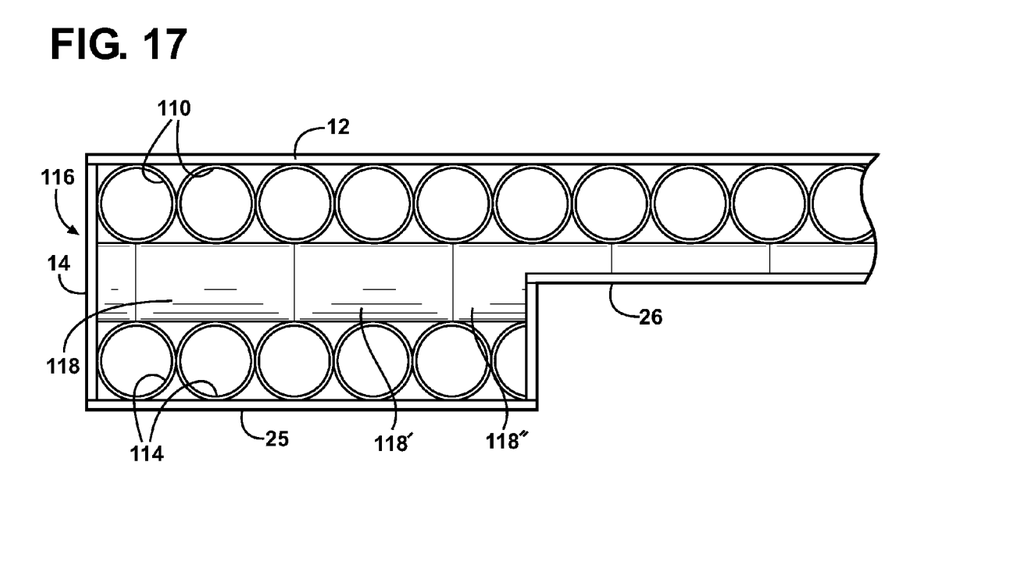
FIG. 17 is a slight modification of the illustration of FIG. 12 and by which the intermediate extending row of tubular portions are segmented.

FIG. 15 is an illustration 102 similar to FIG. 11 and depicting upper 104 and lower 106 parallel extending rows of tubular portions. FIG. 16 is an illustration 108 similar to FIG. 12 and depicting first 110, second 112 and third 114 horizontally extending and vertically spaced rows of tubular portions in alternating crosswise extending fashion. FIG. 17 is a slight modification 116 of the illustration of FIG. 12 and by which the intermediate extending row of tubular portions are segmented, at 118, 118', 118" et seq.

Figure 18:
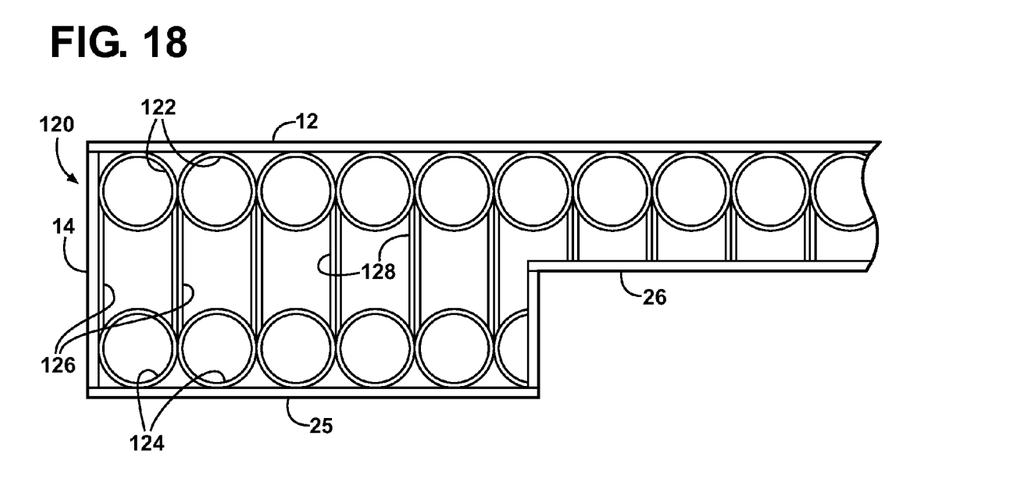
FIG. 18 is a further modification of a plurality of elongate portions each including upper and lower tubular components separated by parallel and spaced structural supporting walls.

Finally, FIG. 18 is a further modification 120 of the structural substrate and in which a plurality of elongate portions are provided. The elongate portions as illustrated each include upper 122 and lower tubular 124 components separated by parallel and spaced structural supporting walls 126 and 128 and are arranged in aligning and overlapping fashion as shown.

The structural substrate can exhibit, without limitation, any desired length, width, height/thickness dimension. It is also envisioned and understood that the construction and arrangement of the interior structural supporting portions are not limited to those illustrated and that further structural deeming interior patterns or structure beyond those shown are also envisioned.

Having described my invention, other and additional preferred embodiments will become apparent to those skilled in the art to which it pertains, and without deviating from the scope of the appended claims.

I claim:

1. A structurally reinforcing article, comprising:
  a body having a three dimensional shape with a top, sides and bottom, said body encasing a plurality of structural supporting portions arranged according to a specified pattern, said structural supporting portions further comprising a plurality of aligned and extending tubular portions each having and outer tubular portion and an inner coaxial portion; and
  a plasticized material applied over said body according to a selected thickness and in order to encapsulate said insert.

2. The invention as described in claim 1, said tubular portions extending in at least one of a horizontal and vertical direction relative to said top and sides of said body.

3. The invention as described in claim 1, said structural supporting portions further comprising a first upper row of tubular portions, a second lower row of tubular portions extending crosswise relative to said upper row.

4. The invention as described in claim 3, further comprising a third lowermost row of tubular portions extending crosswise relative to said second row and parallel relative to said first upper row.

5. The invention as described in claim 4, said second row of tubular portions further comprising a plurality of segmented portions.

6. The invention as described in claim 1, further comprising a central row of tubular portions separated by upper and lower crosswise extending and half tubular portions.

7. The invention as described in claim 1, further comprising a first upper row of tubular portions and a second lower and parallel extending row of tubular portions.

8. The invention as described in claim 1, said structural supporting portions further comprising upper and lower tubular components separated by parallel and spaced structural supporting walls.

9. The invention as described in claim 1, said body and structural supporting portions exhibiting a specified shape and size and each further comprising at least one of a galvanized steel, corrugated paperboard, or like rigid and structurally supporting material.

10. The invention as described in claim 1, said plasticized material further comprising at least one of a composite heat/fire thermosetting and a thermoplastic material.

11. The invention as described in claim 1, said article operating as a reinforced pallet and further comprising engageable forklift apertures and attachable strap locations for hold-down of supported items.

12. The invention as described in claim 1, said article operating as a load supporting pallet, at least one of said sides and bottom being opened to allow for application of the plasticized material across at least one surface associated with each of said structural supporting portions.

13. A structurally reinforcing article, comprising:
  a body having a three dimensional shape with a top, sides and bottom, said body encasing a plurality of structural supporting portions each exhibiting a "U" shape with a curved base and interconnected sides extending between said top and bottom; and
  a plasticized material applied over said body according to a selected thickness and in order to encapsulate said insert.

14. The invention as described in claim 13, said "U" shaped structural supporting portions being arranged in aligning and alternating fashion when viewed from a crosswise extending direction.

15. A structurally reinforcing article, comprising:
  a body having a three dimensional shape with a top, sides and bottom, said body encasing a plurality of structural supporting portions arranged according to a specified pattern, said structural supporting portions further comprising a plurality of aligned and extending tubular portions;

said structural supporting portions further comprising a first upper row of tubular portions, a second lower row of tubular portions extending crosswise relative to said upper row, a third lowermost row of tubular portions extending crosswise relative to said second row and parallel relative to said first upper row; and a plasticized material applied over said body according to a selected thickness and in order to encapsulate said insert.

16. A structurally reinforcing article, comprising:

a body having a three dimensional shape with a top, sides and bottom, said body encasing a plurality of structural supporting portions arranged according to a specified pattern, said structural supporting portions further comprising a plurality of aligned and extending tubular portions;

an interconnecting and crosswise extending wall grid pattern intersecting said tubular portions and extending between said top and bottom for achieving additional structural support; and a plasticized material applied over said body according to a selected thickness and in order to encapsulate said insert.

* * * * *